United States Patent
Kochman et al.

(10) Patent No.: US 6,452,138 B1
(45) Date of Patent: Sep. 17, 2002

(54) MULTI-CONDUCTOR SOFT HEATING ELEMENT

(75) Inventors: Arkady Kochman, Highland Park; Arthur Gurevich, Wilmette, both of IL (US)

(73) Assignee: Thermosoft International Corporation, Buffalo Grove, IL (US)

( * ) Notice: Subject to any disclaimer, the term of this patent is extended or adjusted under 35 U.S.C. 154(b) by 0 days.

(21) Appl. No.: 09/309,917

(22) Filed: May 11, 1999

Related U.S. Application Data (63) Continuation-in-part of application No. 09/160,540, filed on Sep. 25, 1998.

(51) Int. Cl.⁷ .................................................. H05B 3/34
(52) U.S. Cl. ...................................... 219/549; 219/529
(58) Field of Search ................................. 219/200, 201, 219/212, 217, 520, 527, 528, 529, 538, 539, 542, 545, 548, 549

(56) References Cited

U.S. PATENT DOCUMENTS

| | | | |
|---|---|---|---|
| 1,703,005 A | * | 2/1929 | Hewitt ........................ 219/545 |
| 2,496,279 A | * | 2/1950 | Ely et al. .................... 219/545 |
| 3,349,359 A | | 10/1967 | Morey |
| 3,385,959 A | | 5/1968 | Ames et al. |
| 3,627,981 A | | 12/1971 | Kuhn |
| 3,657,516 A | | 4/1972 | Fujihara |
| 3,774,299 A | | 11/1973 | Sato et al. |
| 3,808,403 A | | 4/1974 | Kanaya et al. |
| 3,935,422 A | | 1/1976 | Barnes et al. |
| 4,051,094 A | | 9/1977 | Reuter et al. |
| 4,149,066 A | | 4/1979 | Niibe |
| 4,250,397 A | | 2/1981 | Gray |
| 4,309,596 A | | 1/1982 | Crowley |
| 4,523,086 A | | 6/1985 | Eilentropp |
| 4,538,054 A | | 8/1985 | de la Bretoniere |
| 4,713,531 A | | 12/1987 | Fennekles et al. |
| 4,764,665 A | | 8/1988 | Orban et al. |
| 4,792,662 A | | 12/1988 | Kitagaki et al. |
| 4,825,049 A | | 4/1989 | Rickborn |
| 4,983,814 A | | 1/1991 | Ohgushi et al. |
| 5,023,433 A | | 6/1991 | Gordon |
| 5,068,518 A | | 11/1991 | Yasuda |
| 5,298,722 A | | 3/1994 | Tanaka |
| 5,412,181 A | * | 5/1995 | Giamati ....................... 219/548 |
| 5,643,480 A | | 7/1997 | Gustavsson et al. |
| 6,031,214 A | * | 2/2000 | Bost et al. ................... 219/545 |

FOREIGN PATENT DOCUMENTS

| | | |
|---|---|---|
| DE | 21 48 191 A | 4/1973 |
| DE | 32 33 904 A | 3/1984 |
| DE | 32 43 061 A | 5/1984 |
| FR | 2 323 289 A | 4/1977 |
| GB | 1 243 898 A | 8/1971 |
| WO | WO 95 33358 A | 12/1995 |
| WO | WO 98 01009 A | 1/1998 |
| WO | WO 98 09478 A | 3/1998 |

* cited by examiner

*Primary Examiner*—Tu Ba Hoang
(74) *Attorney, Agent, or Firm*—Liniak, Berenato, Longacre & White (57) ABSTRACT

A soft heating element utilizing individually insulated electrically conductive carbon or metal containing threads/fibers or metal wires that are woven together with nonconductive threads, into sheets, sleeves or strips. The individually insulated conductive threads/fibers or metal wires can be laminated between layers of nonconductive insulation. Nonconductive polymer insulation can be extruded around the non-insulated electrically conductive threads/fibers or metal wires to form strips, sheets or sleeves/pipes. The heating element core is shaped in a desired pattern and connected in parallel or in series to the energizing bus conductors. The thermostats are located in areas of folds in order to control their cycling. When dictated by the heating element design, the electrically conductive threads/fibers have a polymer base, which acts as a Thermal-Cut-Off (TCO) material at predetermined temperatures. Metal fibers or metal wires, incorporated in the heating element core, may be utilized as temperature sensors.

33 Claims, 2 Drawing Sheets

MULTI-CONDUCTOR SOFT HEATING ELEMENT

This is a continuation-in-part of application Ser. No. 09/160,540 filed on Sep. 25, 1998.

BACKGROUND OF INVENTION

1. Field of Invention

This invention relates to soft and flexible electrical heaters, and particularly to heating elements, which have soft and strong metal or carbon containing electrically conductive threads/fibers.

2. Description of the Prior Art

Heating elements have extremely wide applications in household items, construction, industrial processes, etc. Their physical characteristics, such as thickness, shape, size, strength, flexibility and other characteristics affect their usability in various applications.

Numerous types of thin and flexible heating elements have been proposed. For example, U.S. Pat. No. 4,764,665 to Orban et al. discloses an electrically heated fabric for use in gloves, airfoils and aircraft parts. In this patent the fabric is metallized after being formed in a glove structure, following weaving or arranging in a non-woven format. Copper bus bars are utilized for introduction of electrical current to the metallized textile. Having been made of a solid piece of fabric with metallized coating, this heating element doesn't allow for flexibility in selection of desired power density.

The metallizing of the formed heating element results in a loss of significant economies of scale, only a small number of embodiments can be achieved, thus severely limiting the potential application of this invention. The '665 design is also not conducive to tight hermetic sealing through the heater areas (no gaps inside), which can cause a short circuit through puncture and admission of liquid into the body of heating element. this element can't be used with higher temperatures due to the damage caused to the polyaramid, polyester or cotton metallized fabric, described in the invention.

Another prior art example is U.S. Pat. No. 4,713,531 to Fennekels et al. Fennekels et al. discloses a sheet textile structure having resistance elements combined with it. These resistance elements comprise metallic fibers or filaments with a denier like that of natural or synthetic textile fibers, and with overall cross sectional thickness of 8 to 24 microns. The '531 design suffers from the following drawbacks: being a sheet product, it is not conducive to hermetic sealing through the body of the heater (no gaps inside), only perimeter sealing is possible, which can result in a short circuit due to puncture and admission of liquid into the body of the heating element; yarns, comprising metal fibers, lack consistency of electrical resistance per given length, and their stretching, compression, or both, will result in very wide fluctuations in resistance, thus limiting the use of this technology in embodiments controlled by strict design and where an uncontrollable power output and temperature variability are unacceptable; yarns are very heavy: from 1 to 7 grams per 1 meter of yarn; the use of silver fibers makes these yarns very expensive; individual conductors have a large cross sectional thickness, each having an outer sheath of braided textile or elastomer.

Another prior art example is U.S. Pat. No. 4,538,054 to de la Bretoniere. The heating element of de la Bretoniere '054 suffers from the following drawbacks: its manufacturing is complex requiring weaving of metal or carbon fibers into non-conductive fabric in a strictly controlled pattern; the use of the metal wire can result in breakage due to folding and crushing and it affects softness, weight and flexibility of the finished heater; it can not be manufactured in various shapes, only a rectangular shape is available; only perimeter sealing is possible (no gaps inside), which can result in a short circuit due to puncture and admission of a liquid into the body of the heating element; the method of interweaving of wires and fibers does not result in a strong heating element, the individual wires can easily shift adversely affecting the heater durability; the fabric base of the heating element is flammable and may ignite as a result of a short circuit; it is not suitable for high temperature applications due to destruction of the insulating weaving fibers at temperatures exceeding 120° C.

A heating element proposed by Ohgushi (U.S. Pat. No. 4,983,814) is based on a proprietary electroconductive fibrous heating element produced by coating an electrically nonconductive core fiber with electroconductive polyurethane resin containing the carbonatious particles dispersed therein. Ohgushi's manufacturing process appears to be complex, it utilizes solvents, cyanates and other toxic substances. The resulting heating element has a temperature limit of 100° C. and results in a pliable but not soft heating element. In addition, polyurethane, used in Ohgushi's invention, when heated to high temperature, will decompose, releasing very toxic substances, such as products of isocyanide. As a consequence, such heating element must be hermetically sealed in order to prevent human exposure to toxic offgassing. Ohgushi claims temperature self-limiting quality for his invention, however "activation" of this feature results in the destruction of the heater. He proposes the use of the low melting point non-conductive polymer core for his conductive fabric-heating element, which should melt prior to melting of the conductive layer, which uses the polyurethane binder with the melting point of 100° C. Thus, the heating element of Ohgushi's invention operates as Thermal Cut Off (TCO) unit, having low temperature of self-destruction, which limits its application. U.S. Pat. No. 4,149,066 to Niibe et al. describes a sheet-like thin flexible heater made with an electro-conductive paint on a sheet of fabric. This method has the following disadvantages: the paint has a cracking potential as a result of sharp folding, crushing or punching; the element is hermetically sealed only around its perimeter, therefore lacking adequate wear and moisture resistance; such an element can't be used with high temperatures due to destruction of the underlying fabric and thermal decomposition of the polymerized binder in the paint; the assembly has 7 layers resulting in loss of flexibility and lack of softness.

U.S. Pat. No. 5,861,610 to John Weiss describes the heating wire, which is formed with a first conductor for heat generation and a second conductor for sensing. The first conductor and a second conductor are wound as coaxial spirals with an insulation material electrically isolating two conductors. The two spirals are counter-wound with respect to one another to insure that the second turns cross, albeit on separate planes, several times per inch. The described construction results in a cable, which has to be insulated twice: first, over the heating cable and second, over the sensor cable. The double insulation makes the heating element very thick, stiff and heavy, which would be uncomfortable for users of soft and flexible products such as blankets and pads. The described cable construction cannot provide large heat radiating area per length of the heater as it would be possible with strip or sheet type of the heating element. The termination with electrical connectors is very complicated because of stripping of two layers of insulation. In addition, in the event of overheating of a very small surface area of the blanket or pad (for example several square inches), the sensor may fail to sense very low change in total electrical resistance of the long heating element. Such heating cable does not have Thermal-Cut-Off(TCO) capabilities in the event of malfunction of the controller.

The present invention seeks to alleviate the drawbacks of the prior art and describes the fabrication of a heating element comprising metal microfibers, metal wires, metal coated, carbon containing or carbon coated threads/fibers, which is economical to manufacture; does not pose environmental hazards; results in a soft, flexible, strong, thin, and light heating element core, suitable for even small and complex assemblies, such as handware. A significant advantage of the proposed invention is that it provides for fabrication of heating elements of various shapes and sizes, with predetermined electrical characteristics; allows for a durable heater, resistant to kinks and abrasion, and whose electrophysical properties are unaffected by application of pressure, sharp folding, small perforations, punctures and crushing. A preferred embodiment of the invention consists of utilizing of metal and carbon coated synthetic textile threads having a Thermal Cut Off (TCO) function to prevent overheating and/or fire hazard.

SUMMARY OF THE INVENTION

The first objective of the invention is to provide a significantly safe and reliable heating element which can function properly after it has been subjected to sharp folding, kinks, small perforations, punctures or crushing, thereby solving problems associated with conventional flexible heating metal wires. In order to achieve the first objective, the electric heating element of the present invention is comprised of insulated electrically conductive threads/fibers or metal wires. The conductive threads/fibers may be made of carbon, metal microfibers, textile threads coated with metal, carbon, conductive ink, or their combination. The proposed heating element may also comprise metal wires and their alloys. The conductive threads/fibers possess the following characteristics: (a) high strength; (b) high strength-to-weight ratio; (c) softness, (d) flexibility. The heating element core described in this invention is comprised of electrically conductive strips, sleeves, sheets or cables, which radiate a controlled heat over the entire heating core surface.

A second objective of the invention is to provide maximum flexibility and softness of the heating element. In order to achieve the second objective, the electric heating element of the invention contains thin (01 to 3.0 mm, but preferably within the range of 0.05–1.0 mm) individually insulated conductive threads/fibers or metal wires, which are woven or stranded into continuous or electrically connected strips, sleeves/pipes, cable or sheets. Another preferable configuration consists of extruding soft insulating material, such as, but not limited to PVC, polyurethane, temperature resistant rubber, cross-linked PVC or polyethylene around a multitude of conductive thread/fiber or wire electrical conductors provided that said electrical conductors are separated by said insulating material.

A third objective of the invention is to provide for the uniform distribution of heat, without overheating and hot spots, thereby solving the problem of overinsulation and energy efficiency. In order to achieve this objective, (a) conductive threads in the heating elements are separated by non-conductive fibers/yarns or insulating polymers, (b) one side of the heating element may include a metallic foil or a metallized material to provide uniform heat distribution and heat reflection. It is also preferable that the soft heating elements of the invention are made without thick cushioning insulation, which slows down the heat delivery to the surface of the heating unit.

A forth objective of the invention is to provide for ease in the variation of heating power density, thereby solving a problem of manufacturing various heating devices with different electric power density requirements. In order to achieve the forth objective, the electroconductive threads/yarns, fibers or metal wires are first insulated by polymer, creating multiple thin cables, which then laminated between woven or non-woven fabric, or interwoven with nonconductive threads into strips, sleeves/pipes or sheets with predetermined width, density of weaving and thickness. It is preferable that the strips and sleeves/pipes, sheets are made of combination of threads/fibers with different electrical resistance and/or include electrically nonconductive high strength polymer or inorganic (such as refractory ceramic or fiberglass) fibers.

A fifth objective of the invention is to provide a high level of temperature control. In order to achieve the fifth objective, at least one of the following is applied: (A) at least one thermostat is wrapped by the heating element or located in the place of multiple folding of the heating element core; (B) at least one of conductive threads or wires, running through the whole length of the heating element is connected to an electronic device operated by a change of electrical resistance, caused by the integral temperature change in the sensor, (C) a controller is set for periodic ON/OFF cycling.

The sixth objective of the invention is to provide a high level of safety, minimizing possibility of fire hazard. In order to achieve the sixth objective: (A) multiple thin conductive cables are reinforced by strong and flame retardant threads/fibers, and (B) the conductive media of the heating cables may comprise metal or carbon containing textile polymer threads/fibers having melting point from 120° C. to 320° C. The melting of the conductive threads/fibers results in breaking of electrical continuity in the heating system. Thus the proposed heating elements can operate as a high temperature fuse or TCO (Thermal-Cut-Off) device.

The present invention comprises a heating element containing soft, strong and light electrically conductive threads/fibers acting as conducting media. The heating element is also highly resistant to punctures, cuts, small perforations, sharp folding and crushing. It can be manufactured in various shapes and sizes, and it can be designed for a wide range of parameters, such as input voltage, desired temperature range, desired power density, type of current (AC and DC) and method of electrical connection (parallel and in series). A heating element preferably consists of nonconductive fibers/yarns or insulating polymers which are combined with electrically conductive individually insulated metal or carbon containing threads/fibers by weaving into or, laminating between layers of fabric, forming strips, sleeves/pipes or sheets.

The selected areas of the heating element core may contain electroconductive threads or wires to provide sensing of resistance/current change caused by variation of the heat. The heating element core is shaped by folding or assembling said individually insulated conductive media into a predetermined pattern. The terminals are attached to ends of said heating element core, which are electrically connected in parallel or in series. In the event of utilizing an alternating current, the individually insulated cables in the heating element core may be connected in such a way as to minimize electromagnetic field (EMF). The following are some of the methods for reducing/eliminating EMF in the preferred embodiments of the invention:

(a) Utilizing of the voltage step-down transformer;

(b) Utilizing of the voltage step-down transformer and rectifier;

(c) Utilizing of the AC rectifier with filtering capacitor;

(d) Providing of simultaneous opposite current flow in the individually insulated cables of the heating element core.

DETAILED DESCRIPTION OF THE INVENTION

The invention consists of a soft heating element core made by interconnecting of individually insulated conductive metal and/or carbon containing threads/wires with non-conductive yarns/fibers or polymers. Said core is assembled as strips, sleeves, pipes and sheets. The heating element core may contain, electrically conducting metal microfibers, metal coated and/or carbon containing threads, which are combined with non-conducting yarns/fibers or polymers in various proportion and/or weaving patterns in order to augment the heating element core electrical resistance. For convenience of explanation of the invention, the term "thread" shall mean stitching thread, knitting thread, and weaving thread or yarn formed by structures, composed of either individual fibers, or monofilament continuous fiber, or discontinuous fibers of their combination. For convenience of explanation the term "individually insulated conductive threads/fibers or metal wires" shall mean thin cables made of conductive threads/fibers or metal wires with or without inclusion of nonconductive threads/fibers, stranded or twisted in a continuous bundle which are then insulated by nonconductive polymer.

The term "metal microfibers" shall mean metal fibers, having denier size of synthetic textile fibers. The diameter of each metal microfiber is smaller than the lowest commercially available metal wire gage.

The term "metal wire" shall mean metal strand having diameter greater than metal microfiber. Metal wire may contain copper, iron, chromium, nickel, or their combination.

The heating element core described in this invention may comprise one of the following threads/fibers, metal wires or their combination:

1. Metal coated synthetic polymer threads with similar or varying electrical characteristics.
2. Metal coated inorganic threads (made of ceramic or fiberglass fibers) with similar or varying electrical characteristics.
3. Carbon coated inorganic threads (made of ceramic or fiberglass fibers) with similar or varying electrical characteristics.
4. Threads with similar or varying electrical characteristics, impregnated with conductive ink.
5. Metal threads made of metal microfibers with similar or varying electrical characteristics.
6. Metal wires with similar or varying electrical characteristics.
7. Threads/wires, as indicated in 1 through 6 above, with addition of nonconductive polymer synthetic fibers.
8. Threads, as indicated in 1 through 7 above, with addition of nonconductive inorganic, including fiberglass, fibers.
9. Threads/fibers, as indicated in 1 through 8 above with addition of carbon/graphite threads.

The non-conductive material of the heating element core may be in a form of weft or warp weaving yarns, extruded or jacketed insulating polymer, woven or non-woven synthetic fabric or inorganic fibers/textile.

The insulating polymer may be polyvinyl chloride (PVC), silicon rubber, polyethylene, polypropylene, polyurethane, cross-linked polyethylene and PVC, or other cable insulating materials. The laminating of the multiple individually insulated conductive threads/fibers or wires to the non-conductive substrate may be achieved by placing the threads between at least two layers of non-conductive material and subsequent thermal fusing of the sandwich assembly. It is also possible to utilize adhesive or stitching to laminate individually insulated conductive and optional nonconductive threads/fibers between non-conductive material.

The metal coated threads described below in this invention may comprise soft and highly electrically conductive metals such as silver, gold, copper, tin, nickel, zinc, their alloys or multi-layer combination. Such coating may be applied on carbon/graphite, polymer, fiberglass or ceramic threads/fibers by sputtering, electroplating, electroless deposition or other appropriate metal coating techniques.

The term "conductive ink" described in this invention shall mean electroconductive ink, paint or adhesive comprising electroconductive media, such as carbon, graphite or metal particles/fibers dispersed in a solution of nonconductive organic material.

The term "carbon containing threads" described in this invention shall mean carbon/graphite threads or threads coated with carbon or carbon/graphite containing material.

The term "conductive textile" described in this invention shall mean soft electrically conductive substrate comprising electroconductive threads/fibers with or without inclusion of nonconductive materials, such as woven or non-woven textile/fiber.

Figure 1A:
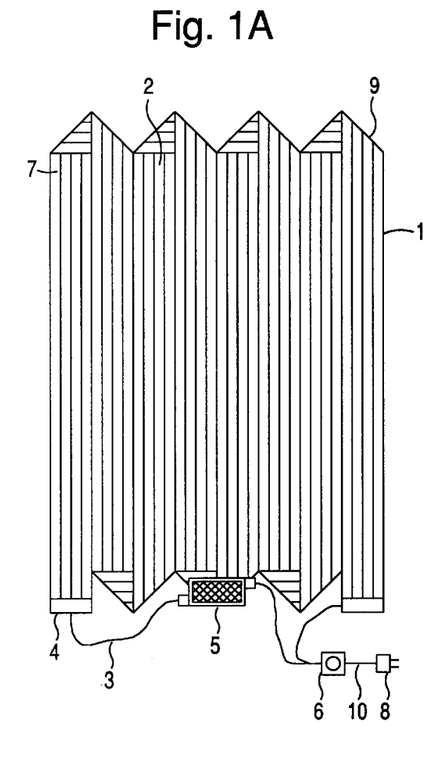
FIG. 1A shows a plan view of the heating element strip laid out in a zigzag pattern, electrically connected in series, and having a thermostat placed on top of fold, according to the preferred embodiment of the present invention.

FIG. 1A shows a possible embodiment of the invention where a heating element consists of heating element core (1), having a shape of a strip, which is laid out in a zigzag pattern. The sections of the strip are contiguous to each other. The heating element core consists of multitude thin cables made of individually insulated conductive threads/fibers or metal wires (2), disposed longitudinally in a strip so as to be separated by non-conductive material. Such placement is achieved through weaving of conductive cables with nonconductive threads or laminating of individually insulated conductive threads/fibers or metal wires between at least two layers of insulating material. The ends of heating element core are stripped of insulation and attached to the terminals (4) and lead wires (3). The terminals (4) may vary from flat electrodes to special crimping splices. It is possible to connect directly the conductive threads/wires of the heating element core with the lead wires by twisting, winding or any other appropriate technique. The individually insulated threads/fibers or metal wires are electrically connected in parallel in the heating element strip in the shown embodiment of the invention.

In addition to the terminals/electrodes (4), the power cord (10) has the following attachments: (a) electric plug (8), (b) optional power control device (6), which may include one, some or all of the following: AC to DC converter, transformer, power level regulator, ON/OFF switch, timer.

An automatic temperature limit control is accomplished through the use of an optional thermostat (5) placed directly on the surface of the heating element core (1), preferably at the location of a heat concentration, such as fold (9). As an alternative to a thermostat or, if dictated by a particular design, in addition to it, optional heating sensor (7) may be utilized. The heating sensors (7) may be in a form of threads/fibers or metal wires incorporated into the heating element core (1) specifically for this purpose or the individually insulated threads/fibers or metal wires (2) can themselves be utilized as sensors. Thus the sensing means may be electrically connected to a separate electrical circuit, specifically designated for temperature control or it may be connected in parallel with other individually insulated threads/fibers or metal wires.

It is important to note that the heating threads/fibers (2), when made from metal coated or carbon containing material coated polymer threads/fibers, can function as TCO safety devices. One, several or all heating threads/fibers may serve this function, depending on the intended use of heater and its design parameters. It is desirable that the limiting (melting) temperature for such TCO threads/fibers be in a range of 120° C.–320° C. This virtually eliminates the possibility for the heating element to become a source of ignition in case of localized overheating, short circuit or other extreme conditions. It is also important to note that melting temperature can be the same or vary for different heating threads/fibers within one heating element core.

Another distinguishing characteristic of metal coated or carbon containing material coated polymer threads/fibers described in this invention is that as the temperature approaches their melting limit, their electrical resistance rises, thus lowering their power output of the heating element. This temperature self-limiting (TSL) capability is also a very important safety feature.

It is also preferable to utilize combination of threads with different thermal characteristics in one heating element core. For example, one heating element strip may contain 3 insulated cables of electroconductive threads/fibers, two of which are made of metal coated synthetic threads having TCO function, and the third cable made of carbon or metal fibers. The threads of the third cable do not have TCO function and can withstand temperatures, exceeding TCO melting limit of other two cables. In the event all 3 cables have the same electrical resistance, each of them will provide ⅓ of electrical power and heat radiated by the heating element. When the temperature of the heating element reaches TCO limit, two cables will melt and open the circuit, reducing the total generating power/current by ⅔. Thus, the heat generated by the system will be significantly reduced, minimizing overheating and fire hazards. It is also possible to utilize threads/fibers with different thermal characteristics in the same individually insulated cables. For example, one cable may contain metal coated synthetic fibers, having TCO capabilities, and metal or carbon fibers which have very high temperatures of decomposition.

Figure 1B:
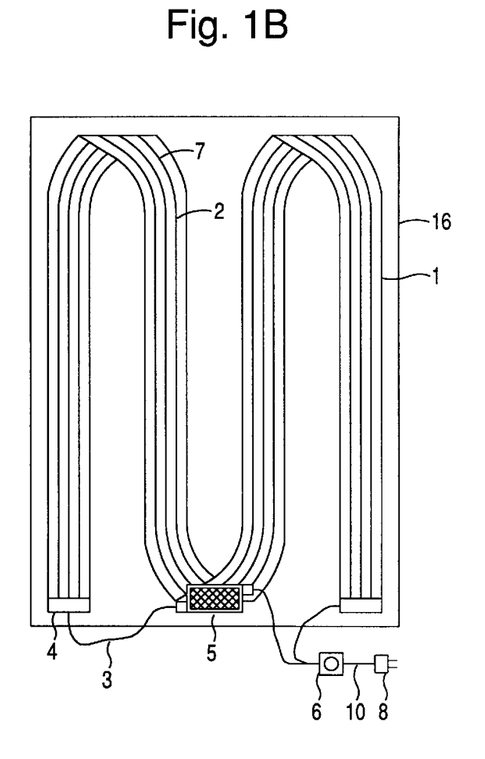
FIG. 1B shows an alternative layout of the heating element strip shown in FIG. 1A utilizing gaps between its sections.

FIG. 1B shows an alternative layout of the heating element core (1) utilizing gaps between its sections.

The ability to provide a very wide flexibility of the heating element design and the possibility of providing numerous safety features, such as thermostat placed on the heating element surface at a point of heat concentration, thermal sensor threads/fibers or wires, TCO threads/fibers, and TSL feature makes this invention novel and its technology superior to those of prior art.

Some of the features, such as TCO and TSL are available only in highly specialized, limited and expensive prior art heating elements, and are based on expensive fabrication technologies, which are different to those described in present invention. It is preferable to utilize a heat reflecting layer (16) on one side of the insulated heating element core if dictated by the heating element design; such heat reflecting layer may be an aluminum foil or a metallized polymer, electrically insulated from the electroconductive heating element components.

Figure 2A:
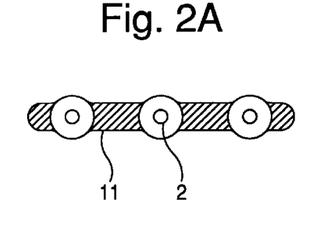
FIG. 2A shows a cross section of a woven strip with individually insulated conductive threads/fibers or metal wires interwoven with nonconductive threads.
Figure 2B:
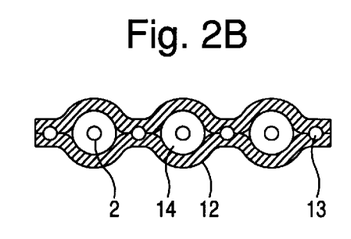
FIG. 2B shows a cross section of the heating element core where the individually insulated conductive threads/fibers or metal wires are laminated between two layers of substrate of nonconductive material.
Figure 2C:
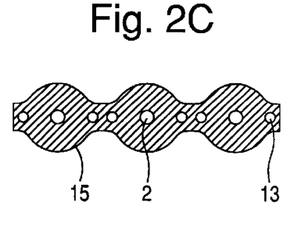
FIG. 2C shows a cross section of the multi-conductor heating cable where a non-conductive polymer is extruded around the non-insulated conductive threads/fibers or metal wires. Optional reinforcing threads/fibers are utilized in the design.

FIGS. 2A, 2B and 2C show alternative examples of the construction of the heating element core.

FIG. 2A shows a cross section of a woven strip where individually insulated conductive threads/fibers or metal wires (2) are interwoven with nonconductive threads (1) It is important to use non-conductive threads having low thermal shrinkage, such as fiberglass, in order to prevent deformation of the heating element core during heating operation. This design allows for a wide range of the heating element core width, from narrow strips to wide sheets.

FIG. 2B shows a cross section of a heating element core, where individually insulated conductive threads/fibers or metal wires (2) are laminated between two strips or sheets of woven or non-woven fabric (12). This design also allows for a wide range of cost effective heating elements, from narrow strips to wide sheets. Optional reinforcing fibers/threads (13) can be added when required by the design. It is also possible to laminate thin conductive heating cables (14) onto only one strip/sheet of substrate material (12) consisting of woven or non-woven fabric, polymer, foil or other suitable substrate.

FIG. 2C shows a cross section of an extruded multiconductor cable consisting of non-conductive polymer (15) extruded around electroconductive threads/fibers or metal wires (2). Optional reinforcing fibers/threads (13) can be added to provide required strength of the heating element.

Figure 3A:
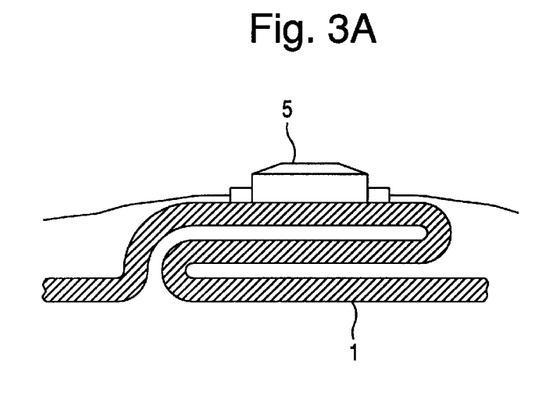
FIGS. 3A shows cross section of a thermostat placed at location of heat concentration in the form of a multiple fold in the length of the heating element strip.
Figure 3B:
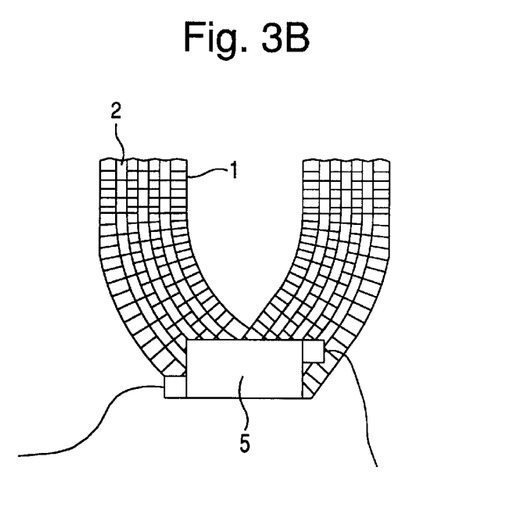
FIG. 3B shows a plan view of a thermostat placed at a location of heat concentration in the form of a fold at the change of the heating strip direction.

FIGS. 3A and 3B show details of placement of thermostat (5) at location of heat concentration. Heat concentration occurs at folds and where heating threads/fibers or wires are placed closer together in one section of a heating element than in other sections. FIG. 3B shows placement of thermostat on the top of the fold produced by a change in the direction of the heating element strip. It is also possible to wrap thermostat by the heating element strip instead of placing it on the top of folded surface of said strip. Such preferable placements of thermostat increase its response to heat elevation, which allows to control on/off cycling of the heating system.

Upon placement of thermostat at the location of heat concentration it is preferable to thermally insulate the location of this assembly in order to avoid dissipation of heat from the thermostat. Such thermal insulation may be in a form of a polymer tape, woven or non-woven fabric, insulating fibers, solid plastic enclosure or any other appropriate thermal insulating material. Alternatively to a thermostat, another form of temperature sensing device, such as thermocouple, connected to the temperature controller, may be utilized.

Undesirable and uncontrolled multiple folding of the heating element can occur in various soft and flexible heating units such as heating blankets and mattress pads. Placement of thermostat, having pre-set temperature limit, on multi-folded portion of the heating element, simulates similar conditions to those having abnormal elevated temperature in any part of the unit not controlled by temperature sensing device. Such construction allows to significantly reduce the amount of thermostats and assembly cost in foldable heating devices having large heat radiating surface area.

It is also desirable to utilize other temperature sensing devices, instead of thermostats, such as thermocouples, to provide controlled cycling of the heating element operation in the described embodiments of this invention. Another temperature control technique, which may be applied in the preferable embodiments of this invention, is utilizing of electronic control with programmed ON/OFF cycling function. For example, the controlling device may be set to turn the heating system "ON" and "OFF" each 1.0–2.0 minutes. Such interrupted heating regime allows to adjust better heat radiation and to prevent overheating.

Figure 4A:
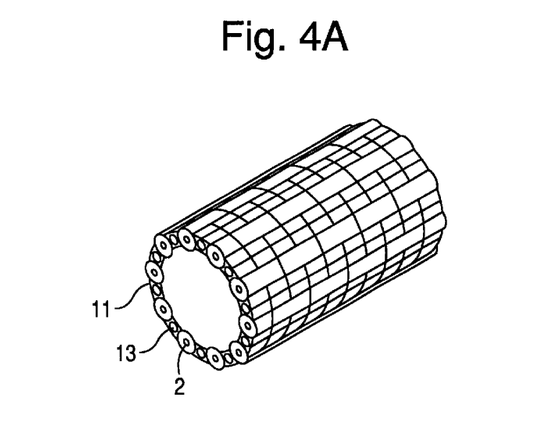
FIG. 4A shows an isometric view of the heating element consisting of a sleeve/pipe woven of the individually insulated conductive threads/fibers or metal wires and non-conductive threads/fibers. Optional reinforcing fibers are utilized in this design.

FIG. 4A shows isometric view of a woven sleeve/pipe heating element core where the individually insulated conductive threads/fibers or metal wires (2) are interwoven with nonconductive threads (11). Optional reinforcement threads (13) are added when required by the design.

Figure 4B:
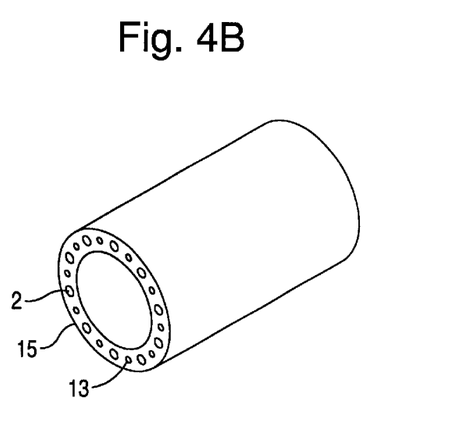
FIG. 4B shows an isometric view of the heating element consisting of a sleeve/pipe formed by extrusion of non-conductive polymer around non-insulated conductive threads/fibers or metal wires. Optional reinforcing threads/fibers are utilized in this design.

FIG. 4B shows an isometric view of an extruded multi-conductor sleeve/pipe heater consisting of non-conductive polymer insulation (15) extruded around the non-insulated heating thread/fibers or metal wires (2). Optional reinforcement fibers/threads (13) are added when required by the design.

In addition to the preferred embodiments shown in FIGS. 4A and 4B a possible embodiment of a sleeve/pipe heater may have a construction consisting of the individually insulated conductive threads/fibers or metal wires, that are laminated between two layers of woven or non-woven fabric or polymer. Optional reinforcing threads/fibers can be added when required by the design. The temperature sensing devices and controls may be the same as described above in previous preferred embodiments of this invention.

It is important to note that individually insulated conductive threads/fibers or metal wires can also be laminated onto only one layer of substrate material consisting of woven or non-woven fabric, polymer, foil or other suitable substrate. The proposed soft heating elements may be utilized in a variety of commercial and industrial heater applications, utilizing direct or alternating current. The main advantage of these heating elements is the high reliability, which is provided by the tightly sealed soft and durable electrically conductive threads.

The process of manufacturing of the insulated heating elements can be fully automated, it utilizes commercially available non- toxic, nonvolatile and inexpensive products. Some designs of the insulated heating core may be manufactured in rolls or spools with subsequent cutting to desired sizes and further attachment of electric power cords and optional power control devices.

Further, the use of electrically conductive metal coated threads, carbon coated inorganic threads, threads impregnated with conductive ink, carbon/graphite yarns, nonconductive ceramic or polymer fibers in the heating element has the following additional advantages:

- it enables manufacturing of thin, flexible and soft heating devices,
- it provides high durability of the heating appliances which can withstand sharp folding, small perforations, punctures and compression without decreasing of electrical operational capabilities;
- it provides high tear and wear resistance owing to: (a) high strength of the conductive threads and (b) tight enveloping around all electrically conductive media with strong insulating materials;
- it provides for manufacturing of corrosion and erosion resistant heating element owing to: (a) high chemical inertness of the carbon coated inorganic threads and ceramic yarns, (b) hermetic polymer insulation of the whole heating element, including electrode connections and temperature control devices, for utilization in chemically aggressive industrial or marine environments;
- it offers versatility of variation of the electrical conductivity of the heating element core owing to: (a) weaving, or stranding of the individually insulated conductive threads/fibers or metal wires to the predetermined width and thickness of the strips, sleeves or sheets; (b) weaving of the threads to the predetermined density or type of weaving; (c) weaving, or stranding of the individually insulated conductive threads/fibers or metal wires having different electrical conductivity in one unit; (d) weaving, or stranding of the individually insulated conductive threads/fibers or metal wires with nonconductive ceramic and/or polymer threads or fibers;
- it provides for saving of electric power consumption owing to: (a) installation of heat reflective layer and (b) possibility of placing the heating element, due to low temperature density, with less cushioning and insulation closer to the human body or to the heated object;
- it allows for manufacturing of heating element with electrical connection of electrically conductive strips, sheets, sleeves/pipes or multiconductor cables in parallel or in series;
- it overcomes the problem of overheated spots owing to (a) high heat radiating surface area of the heating element core, (b) uniform heat distribution by the heat reflective layer, reducing the possibility of skin burns or destruction of the insulating layers;
- it provides for extremely low thermal expansion of the heating element owing to the nature of the electrically conductive threads, polymer or nonconductive yarns/fibers. This feature is extremely important for construction applications (Example: concrete) or for multi-layer insulation with different thermal expansion properties;

it offers high degree of flexibility and/or softness of the heating appliances, depending on the type and thickness of insulation; and it provides technological simplicity of manufacturing and assembling of said heating elements.

Further, the proposed heating elements can be utilized in, but not limited to: (a) electrically heated blankets, throws, pads, mattresses, spreads and carpets; (b) walls, office dividers, window blind vanes, mirrors, fan blades, furniture, ceiling and floor electric heaters; (c) vehicle, scooter, motorcycle, boat and aircraft seat heaters; (d) electrically heated safety vests, garments, boots, gloves, hats and scuba diving suits; (e) food (Example: pizza) delivery and sleeping bags; (f) refrigerator, road, roof and aircraft/helicopter wing/blade deicing systems, (g) pipe line, drum and tank electrical heaters, (h) electrical furnace igniters, etc. In addition to the heating application, the same conductive textile heating element core may be utilized for an anti-static protection or as a flexible antenna for wireless communication.

The aforementioned description comprises different embodiments which should not be construed as limiting the scope of the invention but, as merely providing illustrations of some of the presently preferred embodiments of the invention. Additional contemplated embodiments include: (a) heating element core may include threads made of ceramic fibers, such as alumina, silica, boria, boron nitride, zirconia, chromia, magnesium, calcia, silicon carbide or combination thereof; (b) heating element core may comprise electrically conductive carbon/graphite or metal coated ceramic fibers, such as alumina, silica, boria, zirconia, chromia, magnesium, calcia, silicon carbide or combination thereof; (c) the metal coating can be applied on carbon/graphite threads/yarns; (d) each cable of multi-conductor heating element may contain individual or multiple threads or wires (e) the heating element assembly may comprise the conductive strips, sleeves/pipes, sheets or threads, having different electrical resistance; (f) the heating element core may be formed into various patterns such as serpentine or other desired patterns, including ordinary straight, coil or "U" shaped forms; (g) the electric power cord can be directly attached to the conductive heating element core without the use of terminals/electrodes, it is possible to utilize electrically conductive adhesive, conductive paint, conductive polymer, etc. to assure good electrical connection; (h) the conductive heating element core or individually insulated conductive threads/fibers or metal wires in the heating element core can be electrically insulated by the soft nonconductive fabrics or polymers by sewing, gluing, fusing, spraying, extruding etc., forming a soft multi-layer assembly; (i) the shape holding means can be applied on any part of the heating element core; (j) the multiple heating insulated cables, interwoven with non conductive yarns, can comprise thin resistant metal wires as conductive media; (k) the individually insulated conductive threads/fibers can be applied on, or laminated between color/temperature sensitive fabric or polymer to vary the color of this fabric/polymer by the heat.

While the foregoing invention has been shown and described with reference to a number of preferred embodiments, it will be understood by those possessing skill in the art that various changes and modifications may be made without departing from the spirit and scope of the invention.

What is claimed is:

1. A soft and flexible heating element having a durable construction for incorporation into a plurality of articles, said heating element comprising:

at least one continuous electrically conductive strip, comprising metal containing threads, said strip is cut to a desired length and laid out in predetermined pattern to fit the heated area, providing that said soft heating element comprises at least one gap between portions of at least one of said strips;

a conductive means for introducing an electrical current to said strip, an insulating means for insulating at least said electrically conductive threads with nonconductive means.

2. The soft and flexible heating element according to claim 1, wherein said metal containing threads comprise electrically conductive metal coated synthetic threads.

3. The soft and flexible heating element according to claim 1, wherein said metal containing threads comprise electrically conductive metal coated inorganic threads.

4. The soft and flexible heating element according to claim 1, wherein said metal containing threads comprise electrically conductive metal coated carbon threads.

5. The soft and flexible heating element according to claim 1, wherein said metal containing threads comprise electrically conductive metal fibers.

6. The soft and flexible heating element according to claim 1, further including electrical resistance sensor disposed through the whole length of said strip for providing overheating control capabilities to said heating element.

7. The soft and flexible heating element according to claim 1, further including a shape holding means for connecting and holding said portions of said conductive strip in the predetermined pattern.

8. The soft and flexible heating element according to claim 1, further including a heat reflecting layer, placed on at least one side of said soft heating element, and electrically insulated from said conductive strip and said conductive means.

9. A soft and flexible heating element having a durable construction for incorporation into a plurality of articles, said heating element comprising:

at least one continuous electrically conductive strip, comprising metal wires, said strip is cut to a desired length and laid out in predetermined pattern to fit the heated area, providing that said soft heating element comprises at least one gap between portions of at least one of said strips;

a conductive means for introducing an electrical current to said strip;

an insulating means for insulating at least said electrically conductive threads with nonconductive means.

10. A soft and flexible heating element having a durable construction for incorporation into a plurality of articles, said heating element comprising:

at least one continuous strip, comprising electrically conductive threads, said strip is cut to a desired length and laid out in predetermined pattern to fit the heated area, providing that said soft heating element comprises at least one gap between portions of at least one of said strips;

at least one thermostat, attached to the surface of said strip the area of enhanced heating;

a conductive means for introducing an electrical current to said strip;

an insulating means for insulating at least said electrically conductive threads with nonconductive means.

11. The soft and flexible heating element according to claim 10, wherein said area of enhanced heating comprises portions of said strip which are folded and attached to each other.

12. A soft and flexible heating element having a durable construction for incorporation into a plurality of articles, said heating element comprising:
- a conductive means for introducing an electrical current to said heating element;
- a soft heating element core, comprising carbon containing threads coated nonmetallic inorganic threads, which are electrically connected to said conductive means;
- at least one thermostat, attached to the surface of said heating element core in the area of enhanced heating;
- an insulating means for insulating at least said carbon containing threads with nonconductive means.

13. The soft and flexible heating element according to claim 12, wherein said carbon containing threads comprise carbon fibers.

14. The soft and flexible heating element according to claim 12, wherein said carbon containing threads comprise carbon coated nonmetallic inorganic threads.

15. The soft and flexible heating element according to claim 12, wherein said carbon containing threads comprise threads impregnated with conductive ink.

16. A soft and flexible multiconductor heating element having a durable construction for incorporation into a plurality of articles, said heating element comprising:
- electrically conductive sleeve of continuous cross-section, comprising conductive metal containing threads;
- a conductive means for introducing an electrical current to said conductive sleeve;
- an insulating means for insulating at least said metal containing threads with nonconductive means.

17. The soft and flexible multiconductor heating element according to claim 16, wherein said metal containing threads comprise metal coated textile threads.

18. The soft and flexible heating element according to claim 16, wherein said metal containing threads comprise metal fibers.

19. The soft and flexible heating element according to claim 16, further including at least one temperature sensing means disposed longitudinally in said sleeve.

20. The soft and flexible multiconductor heating element according to claim 19, wherein said temperature sensing means is an insulated heating cable which comprises at least one synthetic thread, having electrically conductive coating, said synthetic thread melts at the temperatures above 120° C. and below 320° C., which terminates electrical continuity in said heating cable.

21. A soft and flexible multiconductor heating cable having a durable construction for incorporation into a plurality of articles, said heating cable comprising:
- electroconductive metal coated nonmetallic fibers, incorporated into continuous textile threads, said threads are encapsulated by insulating means and separated from each other by said insulating means, said cable cut into desired length and electrically terminated by electrode connectors.

22. A soft and flexible multiconductor heating cable having a durable construction for incorporation into a plurality of articles, said heating cable comprising:
- electroconductive metal fibers, incorporated into continuous textile threads, said threads are encapsulated by insulating means and separated from each other by said insulating means, said cable cut into desired length and electrically terminated by electrode connectors.

23. A soft and flexible multiconductor heating element having a durable construction for incorporation into a plurality of articles, said heating element comprising:
- at least one continuous strip, comprising multiple, individually insulated, electrically conductive cables, said cables are disposed longitudinally in said strip, separated from each other by nonconductive means and connected with said nonconductive means;
- an area of heat concentration comprising at least one fold along the length of said strip;
- at least one temperature sensing device attached to the surface of said strip in the area of said heat concentration;
- a conductive means for introducing an electrical current to said strip.

24. The soft and flexible multiconductor heating element according to claim 23, wherein said temperature sensing device comprises thermostat.

25. The soft and flexible multiconductor heating element according to claim 23, wherein said multiple, individually insulated, electrically conductive cables are electrically connected in parallel.

26. A soft and flexible multiconductor heating element having a durable construction for incorporation into a plurality of articles, said heating element comprising:
- at least one continuous strip, comprising multiple, individually insulated, electrically conductive cables, said cables are disposed longitudinally in said strip, separated from each other by nonconductive means and connected with said nonconductive means;
- at least one temperature sensing means disposed longitudinally through the whole length of said strip;
- a conductive means for introducing an electrical current to said strip.

27. The soft and flexible multiconductor heating element according to claim 26, wherein said temperature sensing means and said electrically conductive cables are electrically connected in parallel.

28. The soft and flexible multiconductor heating element according to claim 26, wherein said temperature sensing means is an insulated heating cable which comprises at least one synthetic thread, having electrically conductive coating; said synthetic thread melts at the temperatures above 120° C. and below 320° C., which terminates electrical continuity in said heating cable.

29. A soft multi-conductor heating element having a durable construction for incorporation into plurality of articles, said element comprising:
- at least one continuous electrically conductive textile strip, comprising electrically conductive metal coated carbon fiber threads, said strip is cut to a desired length, folded and laid out to fit within said heating element and define folded portions, provided that said soft heating element comprises at least one gap between the folded portions of said at least one strip;
- a conductive means for introducing an electrical current to said textile strip;
- an insulating means for insulating at least said metal coated carbon fiber threads with a least one layer of non-conductive means.

30. A soft multi-conductor heating element having a durable construction for incorporation into plurality of articles, said element comprising:
- at least one continuous electrically conductive textile strip, comprising metal containing threads, said strip is cut to a desired length, folded and laid out to fit within said heating element and define folded portions, provided that said soft heating element comprises at least one gap between the folded portions of said at least one strip;

a conductive means for introducing an electrical current to said textile strip;

an insulating means for insulating at least said metal containing textile threads with at least one layer of non-conductive means;

electrical resistance temperature sensor disposed through the whole length of said strip for providing overheating control capabilities to said heating element.

31. A soft and flexible heating element having a durable construction for incorporation into a plurality of articles, said heating element comprising:

at least one continuous strip, comprising electrically conductive threads as heating means. said strip is cut to a desired length, folded and laid out to fit within said heating element and define folded portions, providing that said soft heating element comprises at least one gap between the folded portions of said at least one strip;

a conductive means for introducing an electrical current to said strip;

an insulating means for insulating at least said electrically conductive threads with electrically nonconductive means;

at least one temperature sensing device directly attached to the surface of said strip at the location of enhanced heat concentration.

32. A soft and flexible multiconductor heating element having a durable construction for incorporation into a plurality of articles, said heating element comprising:

electrically conductive textile sleeve having hollow interior and continuous cross-section, said sleeve comprising conductive metal containing threads as electrical resistance heating means, said threads are separated from each other by nonconductive means;

a conductive means for introducing an electrical current to said heating means;

an insulating means for insulating at least said metal containing threads with nonconductive means;

at least one temperature sensitive means disposed longitudinally in said sleeve.

33. The soft and flexible multiconductor heating element according to claim 32, wherein said temperature sensing means is an insulated heating cable which comprises at least one synthetic fiber thread, having electrically conductive coating, said synthetic fiber thread melts at the temperature above 120° C. and below 320° C., which terminates electrical continuity in said heating cable.

* * * * *